United States Patent [11] 3,618,882

| [72] | Inventor | Henry A. Podedworny<br>Wayne, Mich. |
|---|---|---|
| [21] | Appl. No. | 862,222 |
| [22] | Filed | Sept. 30, 1969 |
| [45] | Patented | Nov. 9, 1971 |
| [73] | Assignee | Unistrut Corporation<br>Wayne, Mich. |

[54] CABLE SUPPORT TRAY SYSTEM
11 Claims, 11 Drawing Figs.

[52] U.S. Cl..................................................... 248/68 R,
 248/72
[51] Int. Cl..................................................... F16l 3/08,
 F16l 3/22
[50] Field of Search......................................... 248/68 R,
 68 C, 68 B, 49, 72, 243; 138/108

[56] References Cited
UNITED STATES PATENTS
3,521,843 7/1970 Ogle................................ 248/68 R X

| 2,361,943 | 11/1944 | Issoglio.......................... | 248/68 X |
| 2,863,625 | 12/1958 | Attwood........................ | 248/62 |
| 3,022,972 | 2/1962 | Bunston......................... | 248/68 |
| 3,325,129 | 6/1967 | Tinfow........................... | 248/243 |

FOREIGN PATENTS
749,972 6/1956 Great Britain................ 248/68

Primary Examiner—Chancellor E. Harris
Attorney—Hauke, Krass, Gifford and Patalidis ABSTRACT: A cable support tray and tray system for the support of cables, tubes and the like, comprised of parallel longitudinal rail sections connected by transverse rungs, which support the cables, tubes, pipes, etc., in a longitudinal direction corresponding to the direction of the rails, and in which the rungs are constructed and arranged so as to accommodate fastening means in such manner as not to protrude beyond the general plane of the cable trays.

INVENTOR
HENRY A. PODEDWORNY

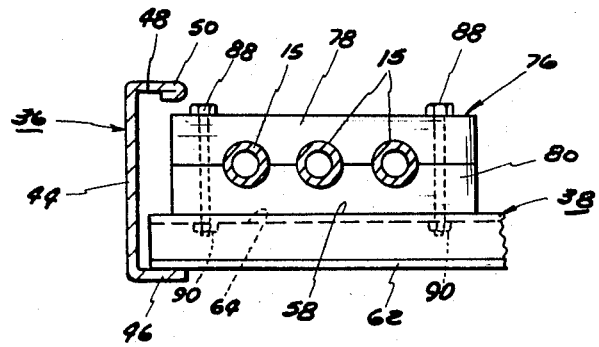
FIG-5
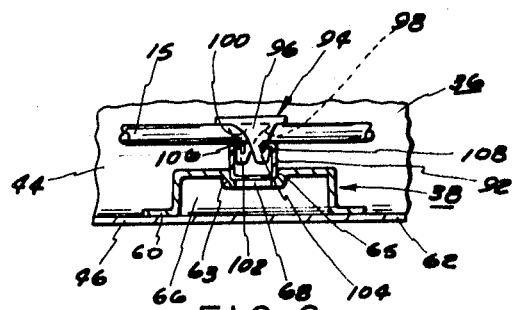
FIG-6
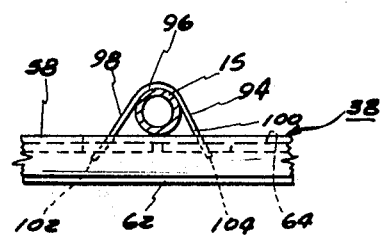
FIG-7
FIG-8
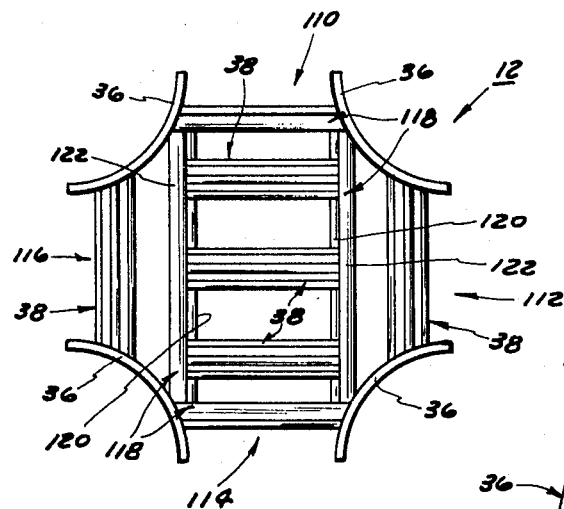
FIG-9
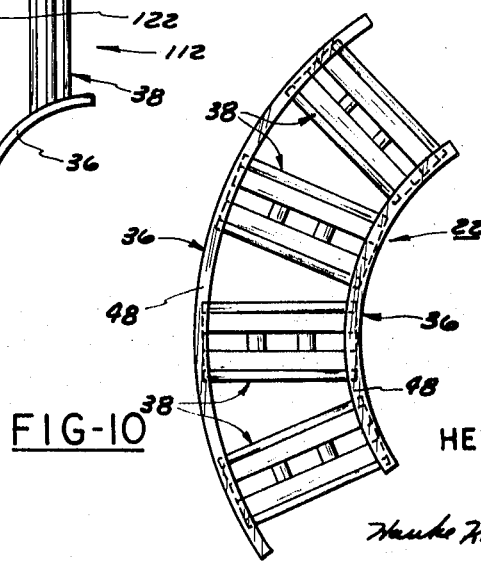
FIG-10
INVENTOR
HENRY A. PODEDWORNY
BY
Attorneys 3,618,882

CABLE SUPPORT TRAY SYSTEM

BACKGROUND OF THE INVENTION

1. Field Of Invention

The present invention relates to cable supports and more particularly to cable racks or trays adapted for the support of cables, pipes, tubes and the like, such as are used in industrial buildings. These racks or trays are designed to support a plurality of cables for electrical transmission, or piping or tubing for transmission of fluids or the like. In industrial buildings, power plants and the like, a multiplicity of cables and tubes are used for transmission of fluid or electrical power to various remote and separate areas in the building or plant. The racks, which support the cables or tubes, are generally constructed from a plurality of separate tray sections of various shapes, such as straight sections, horizontally curved sections, vertically curved sections and connecting sections, such as tees, elbows, crosses and the like, which in assembly are spliced to each other to form a continuous rack assembly which may run in various directions as dictated by the installation requirements and to go around obstacles and the like in the plant. The individual tray sections can be readily disconnected and relocated if the cables or pipes are required to be repositioned.

Brief Description of the Prior Art

Known cable tray structures are ordinarily composed of a pair of parallel side members or stringers of channel configuration which support perforated or extended sheets of metal forming the cable or conduit-supporting bottom of the trays. The perforations in the bottom of the trays are provided for free air circulation through the tray structure and for the attachment of the cables or conduits to the tray bottom by means of clamps, clips or the like. However, since the perforations are in the very bottom of the tray portions, the cable fasteners usually protrude beyond the lower plane of the tray bottom and this presents a hazard to workmen during installation or relocation of the cables and in normal movements beneath them, and will also tend to damage other cables or conduits in installations where the trays are stacked one on top of the other.

Other known cable tray structures are comprised of parallel stringers interconnected by a plurality of fixedly spaced struts or rungs, and the rungs when provided with apertures or perforations for attachment of cable fasteners therethrough create a similar problem of the fasteners protruding beyond the bottom of the trays. An additional problem of known cable trays constructed in ladder-type fashion comprising side members or stringers interconnected by a plurality of spaced rungs is that the rungs are usually attached to the side members by means of locking prongs extending from the ends of the rungs through spaced apertures provided in the side members or stringers. The spaced apertures or slots provided in the side members for attachment of the rungs considerably reduce the load-carrying capacity of these trays by the removal of material from the tension side of the side members. In addition, the fixed location of the pronged apertures in the side members requires a large inventory of side members to be kept for different rung spacings. Additionally, the opening in the top surface of the rung has been found to have inadequate support surface for the cable and presents sharp edges to the cables, which have a tendency to score or damage the cable covering (insulation, rubber, vinyl, neoprene, etc.) thus exposing the inner sheathing to harmful elements or compounds in the vicinity, and or expose the copper or aluminum conductors to short circuit.

SUMMARY OF THE INVENTION

The present invention provides a novel cable tray constructed in a ladder fashion by the provision of parallel stringers or side members of U-channel cross sections with their open sides facing each other, and adapted to support transverse rungs at various spaced locations therealong. The rungs are of double channel shape sections, each channel being the approximate width of a rung in use at the present time, with recessed centers which include perforations or apertures for the attachment of cable fasteners therethrough in such a manner that they do not protrude from the bottom plane of the trays. The rungs are conveniently resistance welded to the stringers at predetermined locations although other known securing means may be used. The recessed apertures in the rungs effectively prevent any damage to the cables supported on the rungs by the elimination of sharp surface edges, and all other surface edges of the rungs are additionally rounded off to eliminate cable or conduit damage. Due to the omission of the prong apertures in the side members, except for the few apertures at the ends of the side members for attachment of the splicers thereto, the load-carrying capacity of the side members is not materially reduced to any extent.

Other novel features and particular advantages will become evident or particularly be pointed out in the following detailed description with reference to the attached drawings.

BRIEF DESCRIPTION OF THE DRAWINGS

In the accompanying drawings, several embodiments of the present invention have been illustrated, in which:

FIG. 5 is a side view of the embodiment illustrated in FIG. 4;

FIG. 6 is still a further cross section through a rung according to the present invention illustrating a further modification of the cable attachment;

FIG. 7 is a side view of still another embodiment illustrating a different use of a cable clip shown in FIG. 6;

FIG. 8 illustrates in a separate view an inside riser tray section for use in the installation assembly shown in FIG. 1;

FIG. 9 illustrates a cross form of cable tray section for use in the installation assembly shown in FIG. 1; and FIG. 10 is a horizontally curved section of a cable tray for similar use in the installation assembly shown in FIG. 1.

DESCRIPTION OF THE PREFERRED EMBODIMENT

Figure 1:
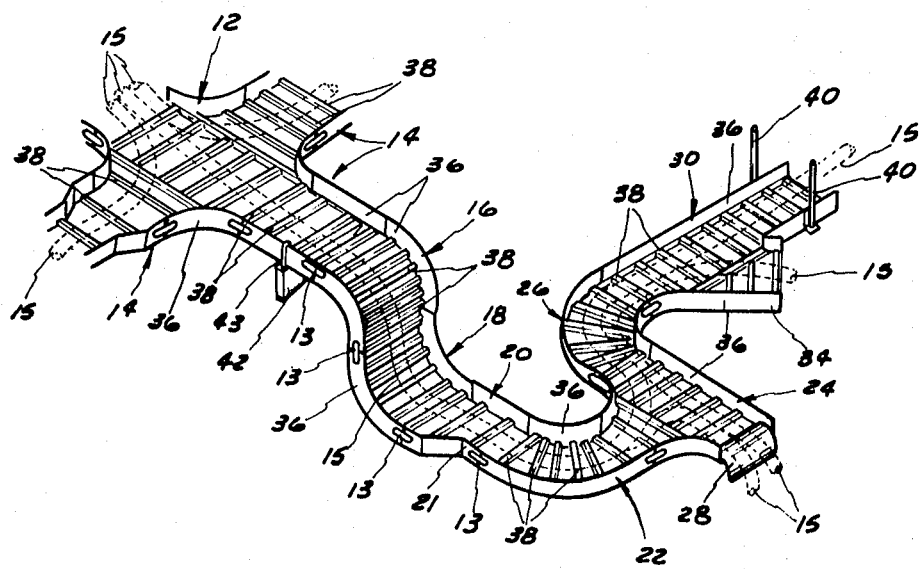
FIG. 1 is a fragmentary perspective view of an exemplary installation assembly of the present novel cable tray structure showing various forms and shapes of the trays.

With reference to FIG. 1 and as best shown therein, a typical cable tray system assembly may include a horizontal cross section 12, such as is shown in enlarged plan view in FIG. 9, for multidirectional cable support. Attached to the branches of the cross section 12 by means of splicer plates 13 are straight cable tray sections 14 leading away from the cross in opposite directions. One of the straight sections is shown attached by splicer plates 13 to an outside riser cable tray section 16, which connects to an inside riser cable tray section 18, such as shown in detail in FIG. 8. The reversed riser cable trays 16 and 18 provide a stepdown rack portion so as to lead the cables or tubes 15 downwardly or upwardly as required. Connected to the lower end of the inside riser 18 as by splicer plates 13 is a short, straight cable tray section 20 having a reducing portion 21 so as to allow the cable rack to clear an obstruction which may be in its way. The reduced end 21 of the straight section 20 is attached to a horizontally curved cable tray section 22, such as is illustrated in FIG. 10, to horizontally change the running direction of the cable 15 and the other end of the curved tray section 22 connects to a branch of a T-cable tray section 24 to again change the direction of the cables as may be required by the plant layout.

One of the opposite leadoff branches of the T-section 24 is connected to another curved tray section 26 and the opposite branch is provided with a dropout 28 for leadoff of the cables or tubes to the particular equipment to which they are connected. The other end of the curved section 26 is connected to the straight portion of a Y-shaped cable tray section 30, which opposite end may be connected to a straight cable tray section. The leadoff branch 34 of the Y-shaped cable tray section 30 may be connected to any shape of cable tray as may be required. Thus, a variety of cable trays of various shapes, as shown in FIG. 1, may be attached in succession to complete any particular type of cable rack as required in any particular installation to enable the cable rack assembly to support pluralities of cables or tubes in various positions, around corners, or to carry them upwards or downwards in different directions as required, and around obstructions which may be in the path thereof.

In general, all of the variously shaped cable tray sections 12 to 32 are composed of a pair of substantially similar parallel stringers 36 positioned in the running direction of the cable rack and connected by pluralities of rungs 38 positioned in a direction transverse to the running direction of the cable rack and which are adapted to support the cables or tubes 15 between the stringers 36. The adjacent tray sections of the cable rack are connected to each other by ties or splicer plates 13 overlapping the abutting ends of adjacent stringers of the individual tray sections. The complete cable rack assembly may be supported for overhead suspension on suspension rods 40 or may be directly supported brackets 42 attached to a suitable wall surface or to upright columns (not shown).

Figure 2:
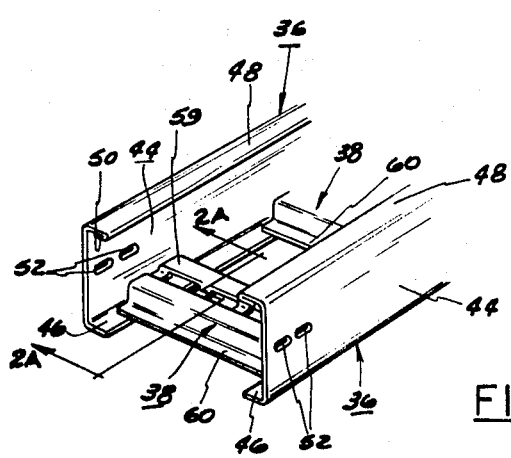
FIG. 2 is a fragmentary perspective illustration of a straight section of cable tray embodying the present invention.
Figure 2A:
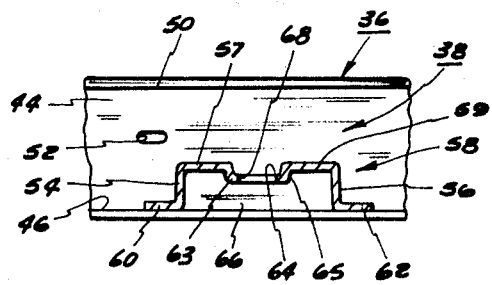
FIG. 2a is an enlarged cross section through one rung of the tray structure shown in FIG. 2, as seen along line 2a—2a thereof.

With particular reference to FIGS. 2 and 2a, the structure of the individual cable trays is shown in detail and by example applying to a straight cable tray section 14. As clearly shown in FIG. 2, the cable tray comprises a pair of opposed parallel side members in the form of stringers 36, which are of channel-shape cross section having each a longitudinal side portion 44 connected to a lower inwardly directed flange 46 and to an upper inwardly directed flange 48, the flanges extending substantially normal to the side portions 44. The edge 50 of the upper flange 48 is preferably reverse-bent so as to provide a reinforced edge portion and to provide a means for the retainment of bracket clamps 43 (FIG. 1) for the support of the rack assembly. At both ends of the side portion 44 of the stringers 36, a plurality of apertures 52 are provided. The apertures 52 are adapted for attachment of the splicer plates 13 thereto (FIG. 1) upon the assembly of adjacent trays to each other.

The stringers 36 are positioned such as to have their flanges 46 and 48 face each other and are transversely connected by a plurality of rungs 38 placed upon the opposing lower flanges 46 of the stringers 36. The rungs 38 are spaced at desired distances along the length of each individual tray section, as illustrated in FIGS. 1 and 10, at which locations they may be spotwelded to the flanges 46 to prevent their displacement.

As more clearly seen in FIG. 2a, the rungs 38 are composed of parallel longitudinal sides 54 and 56 connected by a bridging longitudinal top portion 58. The lower ends of the sides 54 and 56 are integrally connected to outwardly extending longitudinal flange portions 60 and 62 which extend substantially normal from the sides 54 and 56. The rungs are assembled to the stringers 36 such that the outwardly extending flanges 60 and 62 are supported upon the opposite lower flanges 46 of the stringers to which they may then be subsequently welded, brazed or otherwise secured. The longitudinal top portion 58 of the rungs 38 is adapted for support of the cables or tubes 15 thereon; which are longitudinally retained between the side stringers 36. The top portion 58 is provided with a shallow longitudinal recess 64 extending midway between the sides 54 and 56 and dividing the top portion 58 into opposed parallel ridges 57 and 59 which upper surfaces are coplanar with each other. The recess 64 extends about one-quarter distance into the channel 66 formed by the sides 54–56 and top 58, and is provided with a plurality of longitudinal apertures 68 adapted for the extension of cable fasteners therethrough, as illustrated in FIGS. 3–7. The longitudinal apertures 68 are formed by stamping or punching and have a width dimension substantially equal to the width of the longitudinal recess 64 so that the opposite sides 63 and 65 of the recess 64 form inwardly depending flanges for the securement and clamping of fastener members thereto as will now be described.

Figure 3:
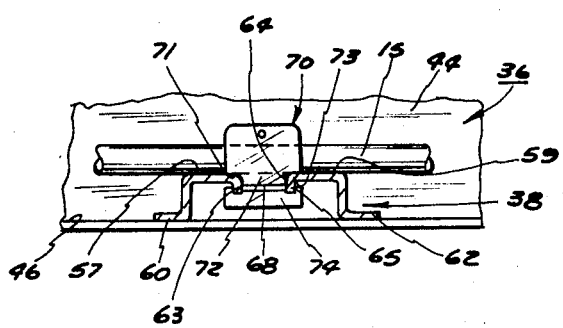
FIG. 3 is a cross section through a rung for a cable tray according to the present invention showing one form of cable attachment to the rung.

With reference to FIG. 3, there is illustrated in cross section a rung 38 upon which is supported on the coplanar surfaces of the ridges 57 and 59 a cable or tube 15. It will be noted that the outer edges of the ridges 57 and 59, including the edges around the apertures 68, are rounded off so as to prevent any damage to the cable 15 during inadvertent movement of the cable across the rung. To limit the displacement of the cable 15 along the rung 38, the cable is clamped to the rung by means of a clamping block 70 through which the cable 15 extends. The clamping block 70 has a reduced diameter neck portion 72 adapted for extension into the longitudinal recess 64 to be retained between the sides 63 and 65 thereof so as to prevent rotation of the block or other undesirable movement within the recess 64. The neck portion 72 forms opposed shoulders 71 and 73 along the block, which have coplanar bottom surfaces for abutment upon the coplanar ridges 57 and 59 to thus retain the block 70 in a vertical aligned position. After insertion of the clamping block 70 into the recess 64, the inwardly depending sides 63 and 65 of the recess are clamped together by means of a springlike clamp 74 or the like. It will be noted that the clamp 74 is of such dimension as not to extend out of the channel 66 of the rung, but instead remains entirely contained within the channel and thus prevents the creation of any hazard by parts protruding from the cable trays. Any desired number of cables 15 of various diameters may be attached along the rungs 38 in the above manner for confinement between the stringers 36 on which the rungs 38 are supported. The number of cables supported on the rungs is only limited by the length of the rungs, which determines the spacing between the stringers 36.

Figure 4:
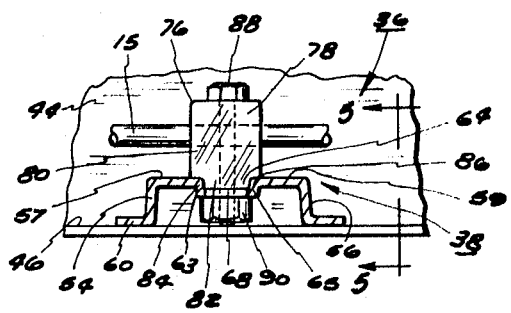
FIG. 4 is a further cross section through a rung according to the present invention showing another embodiment of cable attachment.

With reference now to FIGS. 4 and 5, in this embodiment a plurality of cables or tubes 15 are secured to the rung 38 in side by side, spaced relationship by means of a clamping block 76, which is made up of an upper block portion 78 and a corresponding lower block portion 80, which extend longitudinally along the rung 38. The lower block portion 80 has a reduced neck portion 82 extending from the bottom thereof and adapted to be inserted into the longitudinal recess 64 of the rung to thus retain the lower block portion on the rung and prevent its displacement therefrom. By the formation of the neck portion 82, opposed longitudinal shoulders 84 and 86 are provided, which have coplanar bottom surfaces for abutment upon the coplanar ridges 57 and 59 of the rungs to retain the block 76 in a vertical position relative to the rungs 38. After placement of the cables or tubes 15 upon the lower block portion 80, the upper block portion 78 is put on top of the lower block portion, both of which are provided with suitable cutouts for the reception of the cables or tubes 15. The two block portions are then clamped together and simultaneously to the rung 38 by means of bolts 88 at opposed ends of the blocks, extending through both upper and lower block portions and each through an appropriate aperture 68 in the recess 64 of the rung 38. The bolts 88 are secured within the rung channel 66 by means of nuts 90, which, upon tightening, draw the block 76 down upon the rung 38 for secure clamping attachment. It will be noticed that in this embodiment, similarly, neither the bolts 88 nor the nuts 90 protrude from the rung channel 66. It will also be noted in the embodiment of FIGS. 4 and 5 that the cables or tubes 15 are not in direct contact with the rungs 38 upon which they are supported, but, instead, are retained in an elevated position above the surface of the rungs.

The means of cable attachment to the rung 38, as shown in FIG. 6, contemplates similarly to support the cables or tubes in an elevated position above the rungs 38, which, in this instance, is accomplished by the provision of a channel-type strut 92 having a width dimension substantially corresponding to the width of the longitudinal recess 64 of the rung. The channel strut 92, which is of U-shaped cross section, is placed into the longitudinal recess 64 for extension therealong and with its open side facing upwardly. The cables or tubes 15 are placed across the channel strut 92 for securement thereto by means of a spring-type cable clamp 94, which has a cable-supporting body 96 from which depend oppositely directed spring legs 98 and 100. The spring legs have gripping tongues 102 and 104 respectively at their ends which are adapted upon assembly to be snapped underneath the inwardly bent opposed flanges 106 and 108 at the open side of the channel strut 92. Thus, the spring clamp 94 is securely locked to the strut 92 to thereby retain the cable or tube 15 on the channel strut associated with the rung 38. The cable clamp 94 may be of the type disclosed in U.S. Pat. No. 2,863,625. However, other suitable cable clamps may be used to secure the cable or tube to the strut 92.

The embodiment in FIG. 7 shows the use of the same type cable clamp 94 to attach a cable or tube directly to the rung 38 without the use of the auxiliary strut 92. In this instance, the cable or tube 15 is placed on the rung 38 and the clamp 94 is placed around the cable or tube. The depending spring legs 98 and 100 are then snapped through adjacent apertures 68 to lock behind the inwardly extending sides 63 and 65 of the recess 64, as shown, to thus securely lock the cable or tube to the rung 38.

With particular reference now to FIG. 8, there is shown an inward riser cable tray section 18, which is adapted upon assembly of the cable rack, as shown in FIG. 1, to change the running position of the cables from horizontal to vertical or vice versa. These sections are usually provided in various sizes and lengths and have included angles of various degrees to meet every possible requirement. It will be understood that the inside riser 18 could be assembled either left or right handed depending upon the particular installation. As indicated by the centerlines "C" in FIG. 8, a plurality of rungs 38 are assembled in the riser at equally spaced distances from each other and are preferably welded to the lower flanges 46 of the stringers 36 so that the rungs will stay in place in any position at which the riser will be assembled. The number of rungs provided for the riser section 18 will depend primarily on the length of the riser and its designed load capacity.

FIG. 9 illustrates a plan view of the cable tray cross section 12 shown in assembled position in FIG. 1. The cross section cable tray is designed to change the running direction of the cables or tubes in a horizontal plane, if desired, and is thus provided with branches 110 to 116 to which any type of cable tray, straight, curved, riser or the like, may be attached for the leadoff of the cables in various directions as required by the installation. In order to support the rungs 38 within the confines of the cross 12 formed by the spaced outwardly curved stringers 36, auxiliary supporting struts 118 have been provided to connect the stringers 36. These struts are provided with inwardly facing support flanges 120 upon which the rungs 38 are placed. The upper surfaces 122 of the struts 118 are coplanar with the upper surfaces of the ridges 57 and 59 of the rungs so as to provide a continuous planar support for the cables or tubes 15.

FIG. 10 illustrates a plan view of a curved cable tray section 22 likewise as shown in the assembly of the cable rack in FIG. 1. The curved section cable tray may be of any desired length and may have various degrees of includes angles and may be, of course, installed to face either to the left or to the right. A plurality of rungs 38 at equal angular distances are placed between the opposite curved stringers 36 for connection therewith as by welding to form a homogeneous tray structure.

Thus, it can be seen that the exemplary cable rack assembly, illustrated in FIG. 1, can be made up of a plurality of individual tray sections of various shapes to suit particular requirements. The rungs 38 in the various cable trays will be constructed as described and as shown in FIGS. 2-7 so that the cables may be attached to the rungs without any part of the fastener means protruding from the trays regardless of the shape of the trays. The present invention, as described, provides novel cable attachment means in order to reduce the possibility of damage to the cable or injury to the workmen.

A particular and highly advantageous novel feature in the present cable tray is provided in that the provision of a plurality of spaced apertures for attachment of the rungs to the stringers by means of tabs or prongs has been avoided, thus considerably increasing the load-carrying capacity of the individual cable trays. In addition, the foregoing feature provides a reduction in the required inventory of numerous sizes of stringers since the present invention provides no fixed location for the rungs.

The normally open bottom of the trays could be covered by solid sheets preferably of fire resistant material to prevent flames or sparks from easy access to the cables in case of a blaze or local fire. The bottom of the trays may also be covered with wire mesh expanded metal or the like to catch any loose-falling matter.

The present invention may be embodied in certain other forms without departing from the spirit and essential characteristics thereof, therefore, the present embodiments are considered in all respects to be illustrative only and not restrictive, the scope of the invention being indicated by the appended claims rather than by the foregoing description.

I claim:
1. A support tray for a cable rack comprising:
opposed longitudinal side members, each of which is provided with at least one flange disposed normal to said members,
a plurality of rung members disposed between said side members for support on said flanges to retain said side members in oppositely spaced relation,
each of said rung members comprising a pair of longitudinal sides connected at one edge to a common longitudinal bridge portion,
each of said longitudinal sides having a longitudinal side flange at the other edge extending in a direction normal to said sides,
the side flanges of said rung members being adapted to be supported on said flanges of said side members so that said longitudinal bridge portion will be spaced from said flanges of said side members, and
said longitudinal bridge portion of said rung members having means adapted for the securement of cable fastening means thereto in such a manner that cables fastened thereby are held on said bridge portions and no part of said cable fastening means will protrude beyond the flanges of said side members.
2. The support tray as defined in claim 1, in which said means adapted for the securement of said cable fastening means comprises the provision of a shallow longitudinal recess along said bridge portion, said recess having a plurality of apertures, and said cable fastening means adapted to extend into said recess and through any selected one of said apertures.
3. The support tray as defined in claim 2, in which said recess is located along the longitudinal center of said bridge portion to form oppositely disposed ridges having coplanar upper surfaces adapted for the support of said cables.
4. The support tray as defined in claim 3, in which said cable fastening means comprises a cable clamp having a main body portion and a reduced neck portion, said neck portion adapted to fit into said recess to retain said cable clamp, and opposite shoulders formed between said main body portion and said neck portion adapted for abutment upon said ridges to retain said clamp in a position normal to said bridge portion of said rung member.
5. The support tray as defined in claim 4, in which said cable clamp is secured to said rung member by means of at least one bolt extending through said clamp and through a selected aperture in said recess for engagement with a nut disposed underneath said bridge portion for tightening said fastening means against said bridge portion.

6. The support tray as defined in claim 2, in which said fastening means comprises a spring clip, having a main body portion for extension around said cable, and a pair of oppositely extending diagonally disposed spring legs depending from said main body portion, each of said spring legs being provided with a gripping tongue at its end adapted to retain said spring clip on said rung member upon insertion of each of said spring legs into selected ones of said plurality of apertures.

7. The support tray as defined in claim 6, further comprising the provision of an auxiliary fastening means supported on said rung members within said recess for the support of said cable thereon and fastening of said cable by means of said spring clip.

8. The support tray as defined in claim 7, in which said auxiliary fastening means comprises a channel member having a longitudinal slot along its upper surface adapted to receive said spring legs of said spring clip for locking engagement therewith.

9. An improvement for a cable rack assembly adapted for the support of a plurality of cables or tubes thereon in various running directions comprised in the assembly of a plurality of individual cable tray sections having various directional shapes, said tray sections comprising each at least one pair of opposed stringers, each of said pair of stringers connected by a plurality of rungs adapted to support said cables between said stringers and means to connect the adjacent ends of said stringers to each other to form a continuous rack; the improvement comprising in that said rungs are of channel-type cross section provided with opposed longitudinal flanges adapted for support and attachment of said rungs to said stringers, said channel-type cross section is formed by opposed longitudinal sides each of which is connected to one of said flanges, and a longitudinal bridge portion connects said sides opposite said flanges, said longitudinal bridge portions of said rungs adapted to support said cables, means are associated with said rungs to secure said cables to said rungs, and said means to secure said cables to said rungs comprising a longitudinal recess formed in said bridge portion of said rungs adapted to receive and retain cable clamps, the bottom of said longitudinal recess being disposed in a plane parallel to and spaced intermediate the flanges and the surface of said bridge portion, the bottom of said recess being provided with a plurality of apertures therein for the extension of fastening means therethrough to secure said cable clamps to said rungs, said fastening means being disposed intermediate the bottom of said recess and said flanges.

10. The improvement defined in claim 9, in which said longitudinal recess is formed by opposed sides and said apertures are of a width substantially equal to the width of said recess to permit the clamping together of said sides by clamp means to retain said cable clamps within said recess.

11. The improvement defined in claim 10, in which said longitudinal recess is of substantially shallow depth to prevent said clamp means from protruding beyond the longitudinal flanges of said rungs.

* * * * *